United States Patent

Neel

[15] 3,636,856

[45] Jan. 25, 1972

[54] STEEPING TANK

[72] Inventor: James H. Neel, 6217 Ariel, Houston, Harris County, Tex. 77036

[22] Filed: Apr. 22, 1970

[21] Appl. No.: 30,658

[52] U.S. Cl. ............................................... 99/237, 259/95
[51] Int. Cl. ..................................................... A23b 9/00
[58] Field of Search .................... 99/234, 235, 239, 269, 271, 99/237, 2, 80; 259/4, 95

[56] References Cited

UNITED STATES PATENTS 3,138,369  6/1964  Bennett .................................. 259/95
3,317,191  5/1967  Brown ..................................... 259/4
2,638,838  5/1953  Talmey .................................. 99/237

Primary Examiner—Robert W. Jenkins
Attorney—Pravel, Wilson & Matthews

[57] ABSTRACT

A tank for treating grain including a hollow cylindrically shaped body and an inlet end member and an outlet end member for moving the grain into and out of the body. The inlet and outlet end members include a plurality of nozzles or openings for enabling fluids and air to be circulated through the body while the steeping system is maintained in an isolated state for treatment of the grain inside the tank body.

3 Claims, 4 Drawing Figures

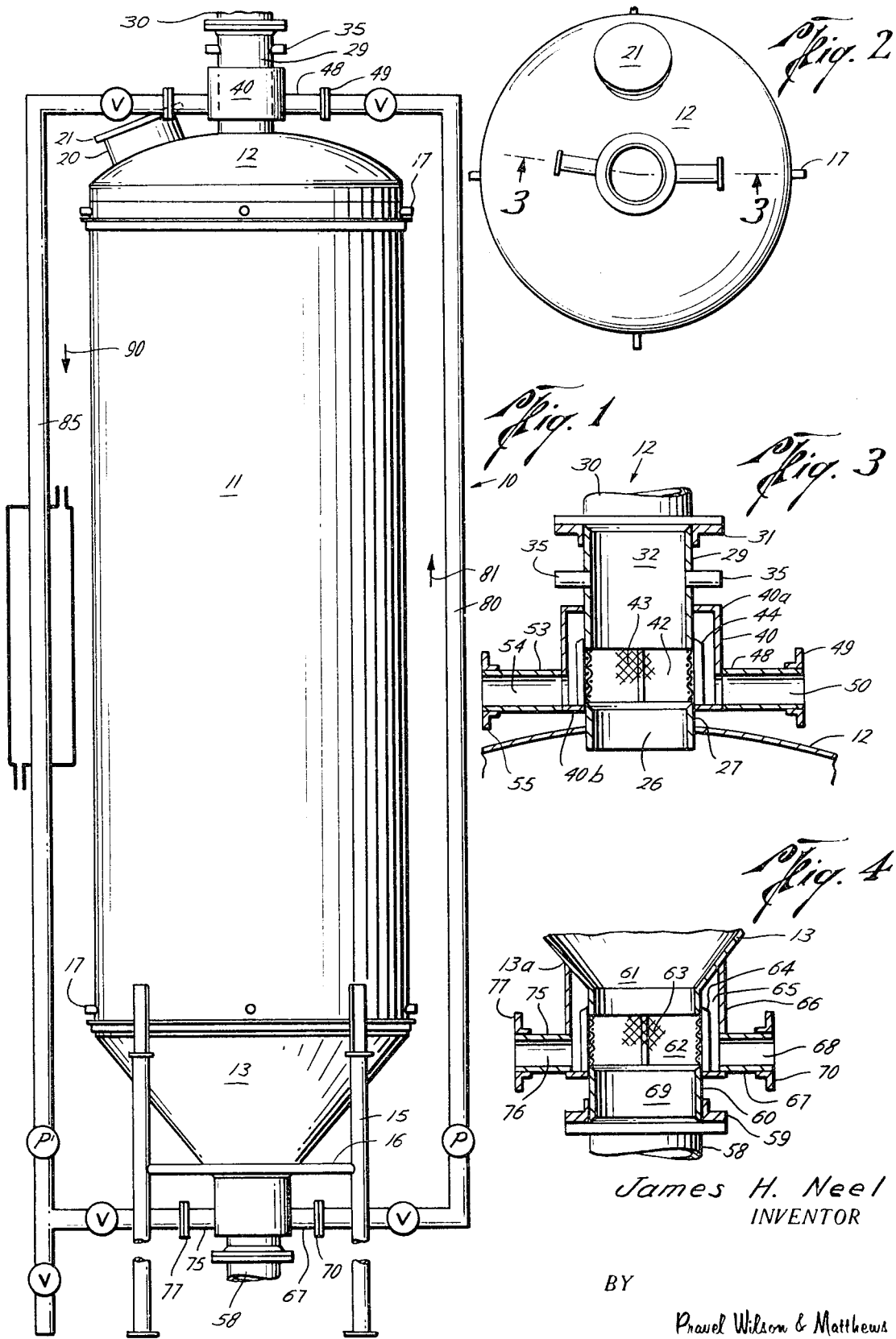

STEEPING TANK

CROSS-REFERENCE TO RELATED APPLICATIONS

This application is related to my application entitled "Process for Treatment of Grain," U.S. Ser. No. 30,656, filed of even date herewith.

BACKGROUND OF THE INVENTION

1. Field of the Invention

This invention relates to the field of steeping tanks for treating grain and more particularly to a new and improved steeping tank for treating grain.

2. Description of the Prior Art

In the prior art, tanks for steeping of grain were common.

It is necessary in most instances to steep grain, such as, for example, rice, to enable the starch to gelatinize so that the grain will become a solid substance. This means that when the rice is milled, it will not break, crack or split during the milling process and is much easier to handle. Also, the process for treating grain which occurs in the steeping tank and which is described in my application referred to hereinabove, kills larvae and insects, and reduces the probability of infestation of the grain after treating.

In other steeping tanks it was very difficult to isolate the grain or seal the grain from the atmosphere while at the same time maintaining the steeping tank full of circulating water and air pressure, and a constant, steady temperature. Also, when it was desirable to drain water from the tank, the rice would flow out of the tank and as the rice was removed it had a tendency to clog up the water drain.

Further, there were problems in introducing the water into the tank without washing all of the rice out of the tank. Also, since the water was used to heat the grain in the tank, the water flow through the tank should have been uniform so that saturation of the grain would have been uniform, but this result was seldom achieved.

SUMMARY OF THE INVENTION

Briefly, the present invention relates to a new and improved steeping tank for grain.

It is an object of the present invention to provide a new and improved steeping tank for grain wherein water may be removed from the tank without removing the rice and wherein the water may be removed from the tank without clogging the drain used to remove the water.

Still another object of the present invention is to provide a new and improved steeping tank for grain wherein water may be introduced into the steeping tank without washing all of the grain out of the tank and wherein heat flow and water flow throughout the tank is uniform.

BRIEF DESCRIPTION OF THE DRAWINGS

FIG. 1 is an elevation view of the steeping tank system of the present invention;

FIG. 2 is a top view of the inlet end member of the steeping tank of the present invention;

FIG. 3 is a view taken along line 3—3 of FIG. 2, partly in section, illustrating the different nozzles of the inlet end member in relation to the cylindrical tank member of the present invention; and FIG. 4 is a cross-sectional view of the outlet end member of the present invention.

DESCRIPTION OF THE PREFERRED EMBODIMENT

As illustrated in FIG. 1, the steeping tank of the present invention is generally designated by the numeral 10 and is illustrated as including a vertically positioned, hollow, cylindrically shaped body 11, an inlet end member 12, and an outlet end member 13. A plurality of support legs 15 are secured with the body 11 by any suitable manner such as welding, and extend downwardly to the floor to position the body in a vertical position as illustrated in FIG. 1. Cross support members 16 enable the legs 15 to support each other and the body 11.

A plurality of thermometers 17 are also included for continually gauging the temperature inside the hollow body 11.

As illustrated in FIGS. 2 and 3, the inlet end member 12 is dome-shaped and circular in periphery for attaching to the upper end of the body 11. An opening (not shown) communicates with an enlarged conduit 20 which extends outwardly from the inlet end member 12. A door 21 is normally maintained in a closed position to seal the conduit 20 and thus the inside of the steeping tank 10 from the atmosphere. When it is necessary to repair or maintain the inside of the steeping tank, the door 21 is opened to permit individuals to enter through the conduit 20 into the vertically positioned steeping tank 10.

As illustrated in FIGS. 2 and 3, a plurality of conduits generally designated at 25 are mounted with and communicate with the inside of the body 11 through an opening 26 in the inlet end member 12. A connection member or conduit 27 is secured with the inlet end member 12 and extends upwardly therefrom adjacent the opening 26. A main inlet or grain inlet 29 extends upwardly from the connection conduit 27 as illustrated. The inlet conduit 29 includes a closure member 30 which is adapted to be opened to permit grain to be placed into the tank body 11 and which is also adapted to be closed for sealing the tank body 11 from the atmosphere. As illustrated, the closure member 30 abuts and fits the circular flanged lips 31 adjacent an opening 32 in the grain inlet 29. A pair of inner conduits 35 are mounted with the grain inlet 29 to permit communication of the conduits with the conduit opening 32 to permit air to be pumped into the tank body 11 as desired.

A flow enclosure 40 is mounted at one end 40a just below the air conduits 35 and is mounted at the other end 40b with the connection conduit 27. The enclosure 40 communicates with the opening 32 through a screened opening 42 which thus permits communication with the opening 32 in the grain inlet 29. As illustrated, a screening member 43 is positioned around the circumferential opening 42 by a support member 44 for a purpose to be brought out hereinafter.

A circulation inlet conduit 48 is mounted adjacent the end 40b to the enclosure 40 and is provided with a suitable flanged member 49 for connection with other conduits. The conduit 48 includes an opening 50 therein which communicates through the enclosure 40 and opening 42 and thus into the conduit opening 32 of the grain inlet 29.

As illustrated in FIG. 3, an overflow conduit 53 communicates with the enclosure member 40 and thus the interior of the tank 11 through the opening 42 and conduit opening 32 of the inlet grain conduit 29. The conduit 53 includes an opening 54 and is provided with suitable flange members 55 for connection with other conduits and the like.

The outlet end member 13 is secured to the lower end of the tank body 11 by any suitable means such as welding or the like. As illustrated, a closure member 58 is mounted with a flange 59 of an outlet grain conduit 60. Outlet grain conduit 60 is secured and mounted at its other end adjacent an opening 61 in the end 13a of the funnel-shaped outlet end member 13. A circumferential opening 62 extends around the conduit 60 and is covered by a screen member 63 which is aided by support member 64. The opening 62 communicates with an opening 65 formed by a flow enclosure 66. A circulation out conduit 67 includes an opening 68 which communicates with the opening 65 formed by the flow enclosure 66. This communication enables the opening 68 to communicate with the opening 69 in the outlet grain conduit 60. The circulation out conduit 67 also includes suitable flange members 70 for connection of such conduit 67 with other suitable conduits.

An inlet conduit 75 having an opening 76 also communicates with the opening 65 and thus the opening 69 in the conduit 60 for a purpose to be brought out hereinafter. Such conduit 75 is also provided with suitable flange members 77 for connection with other conduits.

As illustrated in FIG. 1, a conduit member 80 connects the circulation out conduit 67 and circulation in conduit 48 through connection with their respective flange members 70 and 49, respectively. Also, a suitable pump P as illustrated is positioned with conduit 80 for continuous circulation of fluids through the conduit 48 and out the conduit 67. The fluids circulate in the direction of the arrow 81. As illustrated, there is also provided suitable valves V in the conduit line 80 for closing off the conduit lines relative to each other if desired.

As further illustrated in FIG. 1, a suitable conduit line 85 is secured at one end with the flange member 55 of overflow outlet conduit 53, and the other end to flange member 77 of the inlet conduit 75. A heater device is positioned in the conduit line 85 for heating fluids as they are circulated through the conduit line 85 into the conduit 75 and up through the tank 11 and out through the conduit 53 by a suitable pump P' positioned in the conduit line 85. As illustrated, there are also provided suitable valves V for closing the conduit lines relative to each other if desired.

The air conduit lines 35 communicate with a suitable air pump (not shown) for increasing the air pressure in the steeping tank 10 as desired. Of course, a suitable valve is provided for preventing communication of the air pump with the tank 11 as desired.

In the use of the present invention, the closure member 30 is opened and the grain or product is poured into the tank 10. The grain is prevented from being removed by having the closure member 58 closed and the grain is not small enough to go through the screens 43 and 63, respectively, which thus prevents the grain from clogging any of the conduit lines. After the grain is placed in the vessel, the member 30 is closed and fluid, such as water, is pumped into the steeping tank 10 through the conduit 76. It should be noted that the conduit 85 connected with the inlet conduit 76 is connected to an outside conduit (not shown) for initially filling the tank, and for draining the tank of water as desired.

When the tank is full, and after the valves in the conduit 80 have been closed, the water is circulated upwardly through the tank 11 and downwardly through the conduit in the direction of the arrow 90 for continuous heating of the interior of the tank 11 and the grain positioned therein. When the temperature at the top and bottom of the steeping tank 10 has reached a satisfactory and equal temperature, as determined by the thermometers 17, the water pump P' is turned off and the valves V in the conduits 85 are closed. The air conduit 35 is then opened and air pressure is added until a satisfactory number of pounds per square inch has been obtained, and then the air pressure conduits are closed. The valves V in the conduits 80 are then opened and the fluid in the vessel 11 is circulated downwardly through the steeping tank 10 and upwardly through the conduits 80 in the direction of the arrow 81 to enable the grain to homogenize and form a satisfactory globule and thus become a solid substance.

The foregoing disclosure and description of the invention are illustrative and explanatory thereof, and various changes in the size, shape, and materials as well as in the details of the illustrated construction may be made without departing from the spirit of the invention.

I claim:
1. A tank for treating grain and the like comprising:
   a. a hollow cylindrically shaped body;
   b. an inlet end member comprising:
      1. a closable conduit for receiving grain into said body;
      2. closable conduit means for receiving air pumped into said body;
      3. closable conduit means for enabling fluid to be circulated into said body;
      4. closable conduit means for enabling fluid in said body to be removed;
      5. said conduit for receiving grain being the main conduit connected to said inlet end member; and
      6. said conduits for circulating fluid, receiving air, and said conduit for removing fluid each communicating with said conduit for receiving grain;
   c. a screen member mounted between the opening between said conduit for receiving grain and said conduits for circulating fluid and removing fluid from said body wherein grain positioned in said steeping tank is prevented from clogging said conduits; and
   d. an outlet end member comprising:
      1. a closable conduit for removing the grain from said body;
      2. closable conduit means for enabling the fluid to be circulated out of said body; and
      3. closable conduit means for pumping fluid into said body wherein said steeping tank is a closed system under pressure for treating the grain.
2. The structure as set forth in claim 1 wherein:
   a. said conduit for removing the grain from the body is the main conduit connected to said outlet end member; and
   b. said conduit for circulating fluid out of said body and said conduit for pumping fluid into said body each communicate with said conduit for removing grain from said body.
3. The structure as set forth in claim 2 including a screen member mounted between said conduit for removing grain and said conduits for circulating fluid out of said body and for pumping fluid into said body wherein grain positioned in said steeping tank is prevented from clogging said conduits.

* * * * *